Patented Sept. 13, 1938

2,129,794

UNITED STATES PATENT OFFICE 2,129,794

FRICTION ELEMENT

Ray E. Spokes, Ann Arbor, Mich., assignor to The American Brake Shoe and Foundry Company, a corporation of Delaware No Drawing. Application December 2, 1936, Serial No. 113,880

40 Claims. (Cl. 106—7.5)

This invention relates to friction elements of the kind employed in brake couples, clutches and similar devices.

Friction elements of the kind to which this invention pertains are made in a variety of ways, among which is intermixing more or less finely divided friction materials with a binder and molding, pressing or extruding the intermixed materials and binder into the desired shapes, and also the impregnation of sheet material with a binder and subsequently cutting friction element sections from such impregnated sheet material. In the course of manufacture the binders are cured by heat or pressure or both or in some other suitable manner.

Among the wide variety of substances which have been employed as binders in friction elements are substances selected from the group consisting of polymerizing and drying fatty oils, and frequently such substances have been sulphurized to improve the properties thereof when cured by heat, pressure or both heat and pressure or in some other suitable manner. In the use of a friction element containing such a binder, and especially an element which is subjected to high temperatures and pressures in use, a bleeding condition has been encountered which exhibits itself by the presence of an oily film on the surface of the element and such a film has been found to impair the operation of the element inasmuch as it deleteriously affects the stability of the friction characteristics of the element.

Therefore the primary object of my invention is to stabilize the friction characteristics of a friction element and an ancillary object is to overcome the bleeding of an oily film to the surface of a friction element containing a binder embodying one or more substances selected from the group consisting of polymerizing and drying fatty oils.

It is advantageous to employ a strong and durable binder whereby high tensile strength is imparted to friction elements and long life thereof in service is assured. Hence another important object of my invention is to improve the tensile strength and wearing properties of friction elements containing binders embodying one or more substances selected from the group consisting of polymerizing and drying fatty oils.

A more specific object is to so modify binders, and especially those embodying one or more substances selected from the group consisting of polymerizing and drying fatty oils, that the friction characteristics of friction elements containing such binders will be stabilized and the strength and wearing properties of the elements will be improved, and an ancillary object is to incorporate one or more substances selected from the group consisting of trihydroxy acids and tannins preferably along with one or more substances selected from the group consisting of the iron salts of ferrocyanic and ferricyanic acids in friction elements containing binders of the just described kind to thereby attain the aforesaid advantageous results.

While my invention may be advantageously used in friction elements made in any one of a variety of ways, I will specifically describe my invention, by way of illustration, with particular reference to so-called composition friction elements which consist of more or less finely divided friction materials held together by a binder embodying one or more substances selected from the group consisting of polymerizing and drying fatty oils, and more especially a sulphurized vegetable oil of the type purely polymerized and not otherwise chemically changed.

Among the friction materials which may be advantageously employed in such composition friction elements are asbestos and pyrobituminous material which, in the manufacture of the elements, are thoroughly intermixed one with the other and with a substance or substances selected from the group consisting of polymerizing and drying fatty oils along with sufficient sulphur to improve the binder afforded by such substance or substances as well as sufficient solvent to effect uniform dispersion of the ingredients, the solvent being eliminated in the cure of the elements.

In composition friction elements such as the just described kind, I add, according to my invention, substantially equal parts of one or more substances selected from the group consisting of trihydroxy acids and tannins and one or more substances selected from the group consisting of the iron salts of ferrocyanic and ferricyanic acids.

A specific example of a suitable substance selected from the group consisting of trihydroxy acids and tannins is 3:4:5 trihydroxybenzoic acid, commonly known as gallic acid and having the formula $C_6H_2(OH)_3COOH$. This is the best known of the trihydroxy acids and has been found to be eminently suitable for use in friction elements containing binders comprised of one or more substances selected from the group consisting of polymerizing and drying fatty oils. However, a tannin or tannic acid may be used if desired or more convenient. The tannins are closely related to gallic acid and are a group of natural products, three groups derived from oak bark being the most common.

While a substance such as gallic acid has a beneficial effect in friction elements, as aforesaid, when used alone, this effect is materially enhanced when such a substance is, or such substances are, used along with one or more substances selected from the group consisting of the iron salts of ferrocyanic and ferricyanic acids. Ferric-ferro cyanide, $Fe_4(Fe(CN)_6)_3$, is a specific example of one such substance and is commonly known as Prussian blue but it is also known as Steel blue, Milori blue, Bronze blue, Antwerp blue, Chinese blue and Paris blue, each of which has different physical properties but they are essentially the same chemically. Ferrous-ferri cyanide, $Fe_3(Fe(CN)_6)_2$, known as Turnbull's blue, and ferrous-ferro cyanide, $FeFe(CN)_6$, are further specific examples of substances selected from the group consisting of the iron salts of ferrocyanic and ferricyanic acids suitable for the purposes of the invention.

A satisfactory composition friction element embodying my invention may be compounded as follows:

| | Parts by weight |
|---|---|
| Asbestos | 65 |
| Pyrobituminous material | 15 |
| Purely polymerized and not otherwise chemically changed vegetable drying oil | 15 |
| Sulphur | 3 |
| Petroleum naphtha solvent | 7 |
| Gallic acid | 1 |
| Prussian blue | 1 |

My invention is advantageous in any friction element containing a binder embodying one or more substances selected from the group consisting of polymerizing and drying fatty oils, whether the element be of the composition type or of the type cut from impregnated sheets or other kindred type.

Primarily my invention resides in modifying binders of the aforesaid kind by adding a substance such as gallic acid along with a substance such as Prussian blue in substantially equal parts to friction elements during the manufacture thereof. The substantially equal parts of such substances are preferably added substantially in the ratio of one part each of such substances relative to fifteen parts of the substance or substances selected from the group consisting of polymerizing and drying fatty oils, and preferably not less than one-half part of a substance such as gallic acid, either with or without one-half part of a substance such as Prussian blue, relative to substantially thirteen to seventeen parts of the selected substance or substances selected from the group consisting of polymerizing and drying fatty oils are added.

The addition of one or more substances such as gallic acid to friction elements in which there is a binder comprising one or more substances selected from the group consisting of polymerizing and drying fatty oils has the effect of overcoming the bleeding of an oil film to the friction surface of such elements, and this effect is more marked when one or more substances such as Prussian blue is also added. This is particularly true when the substances such as gallic acid and Prussian blue are added in the ratio of substantially one part each of such substances relative to fifteen parts of the binder. This also improves the wear and friction properties of the elements. However, satisfactory results may be attained by varying these ratios and furthermore, while the best results are attained by the use of both a substance such as gallic acid and a substance such as Prussian blue, friction elements are improved by the addition of a substance such as gallic acid alone.

The precise nature of the modification effected by the addition to friction elements, in which there is a binder comprising one or more substances selected from the group consisting of polymerizing and drying fatty oils, of one or more substances selected from the group consisting of trihydroxy acids and tannins along with one or more substances selected from the group consisting of the iron salts of ferrocyanic and ferricyanic acid is not known. It is probable that the addition of such substances effects a finer and more uniform dispersion of the sulphur in the oil in those elements in which the binder embodies sulphurized vegetable oil binders for the addition of such substances has been found to be especially desirable in friction elements containing sulphurized vegetable oil binders of the type purely polymerized and not otherwise chemically changed. It is also believed that the presence of such substances has the effect of reducing the soluble part of the cured binder. It is further believed that the addition of one or more substances selected from the group consisting of the iron salts of ferrocyanic and ferricyanic acids has a catalytic effect inasmuch as the effect of the addition of a substance selected from the group consisting of trihydroxy acids and tannins is more pronounced when one or more of the iron salts of ferrocyanic or ferricyanic acids is present. But even though the precise nature of the modification effected is not known, the fact of modification is established since the bleeding of oily film, as discussed heretofore, is overcome, whereby the friction of the elements is stabilized, and the wear and friction properties of the elements are improved.

The preferred form of my invention has been described but it is to be understood that this is capable of variation and modification and I am, therefore, not to be limited to the precise details set forth but desire to avail myself of such changes and alterations as fall within the purview of the following claims:

I claim:

1. A friction element containing a binder embodying sulphurized vegetable drying oil of the type purely polymerized and not otherwise chemically changed, gallic acid, and Prussian blue.

2. A friction element containing a binder embodying sulphurized vegetable drying oil of the type purely polymerized and not otherwise chemically changed, and gallic acid.

3. A friction element containing a binder embodying sulphurized vegetable drying oil of the type purely polymerized and not otherwise chemically changed, gallic acid, and Prussian blue in the ratio of substantially one part each of gallic acid and Prussian blue relative to substantially fifteen parts of the sulphurized vegetable drying oil.

4. A friction element containing a binder embodying sulphurized vegetable drying oil of the type purely polymerized and not otherwise chemically changed, and gallic acid in the ratio of substantially one part of gallic acid relative to substantially fifteen parts of the sulphurized vegetable drying oil.

5. A friction element containing gallic acid, an iron salt of ferrocyanic acid, and a polymerizing fatty oil.

6. A friction element containing gallic acid, an iron salt of ferrocyanic acid, and a drying fatty oil.

7. A friction element containing gallic acid, an iron salt of ferricyanic acid, and a polymerizing fatty oil.

8. A friction element containing gallic acid, an iron salt of ferricyanic acid, and a drying fatty oil.

9. A friction element containing gallic acid, Prussian blue, and a polymerizing fatty oil.

10. A friction element containing gallic acid, Turnbull's blue, and a polymerizing fatty oil.

11. A friction element containing a tannin, an iron salt of ferrocyanic acid, and a polymerizing fatty oil.

12. A friction element containing a tannin, an iron salt of ferrocyanic acid, and a drying fatty oil.

13. A friction element containing a tannin, Prussian blue, and a polymerizing fatty oil.

14. A friction element containing a tannin, an iron salt of ferricyanic acid, and a polymerizing fatty oil.

15. A friction element containing a tannin, an iron salt of ferricyanic acid, and a drying fatty oil.

16. A friction element containing a tannin, Turnbull's blue, and a polymerizing fatty oil.

17. A friction element containing a binder embodying a polymerized drying fatty oil and substantially equal parts, by weight, of gallic acid and an iron salt of ferrocyanic acid.

18. A friction element containing a binder embodying a polymerized drying fatty oil and substantially equal parts, by weight, of gallic acid and an iron salt of ferricyanic acid.

19. A friction element containing a binder embodying a sulphurized and polymerized vegetable drying oil and substantially equal parts, by weight, of gallic acid and an iron salt of ferrocyanic acid.

20. A friction element containing a binder embodying a sulphurized and polymerized vegetable drying oil and substantially equal parts, by weight, of gallic acid and an iron salt of ferricyanic acid.

21. The method of making a friction element which comprises incorporating into the same gallic acid, an iron salt of ferrocyanic acid, and a polymerizing fatty oil.

22. The method of making a friction element which comprises incorporating into the same gallic acid, an iron salt of ferrocyanic acid, and a drying fatty oil.

23. The method of making a friction element which comprises incorporating into the same gallic acid, an iron salt of ferrocyanic acid, and a polymerizing fatty oil.

24. The method of making a friction element which comprises incorporating into the same gallic acid, an iron salt of ferrocyanic acid, and a drying fatty oil.

25. The method of making a friction element which comprises incorporating into the same a tannin, an iron salt of ferrocyanic acid, and a polymerizing fatty oil.

26. The method of making a friction element which comprises incorporating into the same a tannin, an iron salt of ferrocyanic acid, and a polymerizing fatty oil.

27. A friction element containing gallic acid, Prussian blue, and a drying fatty oil.

28. A friction element containing gallic acid, Turnbull's blue, and a drying fatty oil.

29. A friction element containing a tannin, Prussian blue, and a drying fatty oil.

30. A friction element containing a tannin, Turnbull's blue, and a drying fatty oil.

31. A friction element containing tannic acid, an iron salt of ferrocyanic acid, and a polymerizing fatty oil.

32. A friction element containing tannic acid, an iron salt of ferrocyanic acid, and a drying fatty oil.

33. A friction element containing tannic acid, an iron salt of ferricyanic acid, and a polymerizing fatty oil.

34. A friction element containing tannic acid, an iron salt of ferricyanic acid, and a drying fatty oil.

35. The method of making a friction element which comprises incorporating into the same tannic acid, an iron salt of ferrocyanic acid, and a polymerizing fatty oil.

36. The method of making a friction element which comprises incorporating into the same tannic acid, an iron salt of ferrocyanic acid, and a drying fatty oil.

37. The method of making a friction element which comprises incorporating into the same tannic acid, an iron salt of ferricyanic acid, and a polymerizing fatty oil.

38. The method of making a friction element which comprises incorporating into the same tannic acid, an iron salt of ferricyanic acid, and a drying fatty oil.

39. A friction element containing a tannin, an iron salt of an acid selected from the group consisting of ferrocyanic and ferricyanic acids, and a drying fatty oil.

40. The method of making a friction element which comprises incorporating into the same a tannin, an iron salt of an acid selected from the group consisting of ferrocyanic and ferricyanic acids, and a drying fatty oil.

RAY E. SPOKES.